Sept. 9, 1952　　　C. C. MARTIN ET AL　　　2,609,713
PLANETARY GEARING
Filed Jan. 30, 1951

INVENTORS.
CHARLES C. MARTIN
DAVID A. ROUND
BY
Samuel Reese
ATT'Y

Patented Sept. 9, 1952

2,609,713

UNITED STATES PATENT OFFICE 2,609,713

PLANETARY GEARING

Charles C. Martin and David A. Round, Cleveland, Ohio, assignors to David Round & Son, Cleveland, Ohio, a firm Application January 30, 1951, Serial No. 208,594

5 Claims. (Cl. 74—805)

This invention relates to hoists.

It is an object of this invention to provide hoists which shall possess greater efficiency than hoists heretofore known.

A further object is to provide hoists which shall be smoother and substantially silent in operation.

A further object is to provide hoists which shall be more economical to produce.

A further object is to provide hoists which shall embody simpler and fewer parts.

A further object is to provide hoists which shall be lighter in weight.

A further object is to provide hoists which shall be of smaller size and more compact.

A further object is to provide hoists which shall obviate precision shop operations.

A further object is to provide hoists in which wear shall be substantially reduced.

A further object is to provide hoists which shall be so constructed that the means employed to impart eccentric motion to certain gears of the hoists shall also prevent rotation of such gears.

A further object is to provide hoists which shall embody a direct drive connection between the driving or power shafts of the hoists and the means which prevent rotation of eccentrically actuated gears utilized in the hoists.

Other objects of the invention will become clear as the description thereof proceeds.

In the drawings forming part of this specification:

Fig. 1 is an end view of a hoist embodying the instant invention.

Fig. 2 is a vertical section taken on line 2—2 of Fig. 1.

Fig. 3 is a vertical section taken on line 3—3 of Fig. 2.

A hoist including our invention and illustrated in the accompanying drawing embodies a housing member 10 which preferably, although not necessarily, embodies three sections 11, 12 and 13 releasably secured together in any desired manner. The housing section 11 embodies a recess 14 provided with a ball bearing 15 within which one end of a driving or power shaft 16 is journalled. The shaft 16 extends through an opening 18 formed in the intermediate housing section 12. The driving shaft 16 projects through an opening 19 formed in the housing section 13 and adjacent to said opening is journalled in a needle bearing 20 disposed within the hub 21 of an internal gear 22 hereinafter described. The driving shaft 16 is concentric and has mounted thereon between the housing sections 11 and 12 a gear 23 rotatable with the shaft.

The housing section 11 is formed with additional recesses 24 and 25 disposed respectively above and below the recess 14. One end of a driven shaft 26 is journalled within a needle bearing 27 lying in the recess 24. The shaft 26 is also journalled in a needle bearing 28 disposed within an opening 29 of the intermediate housing section 12. The portion 30 of the shaft 26 which lies to the left of the needle bearing 28 as viewed in Fig. 2 of the drawings is arranged in eccentric relationship with respect to the remainder of the shaft. A gear 31 is mounted upon the shaft 26 between the housing sections 11 and 12 for rotation with the shaft and in mesh with the gear 23 mounted upon the driving shaft 16.

Similarly, a driven shaft 32 is journalled in a needle bearing 33 lying within recess 25 of the housing section 11. The driven shaft 32 is also journalled in a needle bearing 34 disposed within an opening 35 in the intermediate housing section 12. To the left of the latter bearing as viewed in Fig. 2 of the drawings the shaft 32 is provided with an eccentric portion 36. A gear 37 is mounted upon the driven shaft 32 between the housing sections 11 and 12 for rotation with said shaft and in mesh with the gear 23 mounted upon the driving shaft 16.

An external gear 38 is mounted upon the eccentric portions 30 and 36 of the driven shafts 26 and 32. For this purpose the eccentric portions 30 and 36 extend through openings 39 and 40 in the external gear 38 and needle bearings 41 and 42 serve to journal the eccentric portions 30 and 36 in these openings. The external gear 38 is also formed with an opening 43 which is eccentric relative to the driving shaft 16 and is of larger diameter than said shaft.

The external gear 38 is in mesh with the internal gear 22 as illustrated more clearly in Fig. 3 of the drawing. As noted hereinabove the internal gear 22 carries the hub 21 supported upon the needle bearing 20. The internal gear 22 is further supported anti-frictionally by means of the bearings 44 and 45. The customary load wheel 46 is secured upon the hub 21 of the internal gear 22 as by means of keys 47 and 48 so as to rotate with the internal gear. As is well known, the load wheel 46 carries the usual chain (not shown) by which a load is carried.

When the drive shaft 16 is rotated as by means of the usual sprocket and drive chain (not shown), or in any other desired manner, rotation is imparted to the gear 23 mounted upon the drive shaft. Since this gear is in mesh with the gears 31 and 37 mounted respectively upon the driven shafts 26 and 32, rotation is also imparted to the latter shafts. During such rotation the eccentric portions 30 and 36 of the driven shafts impart an eccentric motion to the external gear 38 mounted thereon while at the same time preventing rotation of the external gear. During its eccentric motion successive meshing of certain of the teeth of the external and internal gears occurs whereby rotation is imparted to the internal gear and to the load wheel mounted thereon in order to lift the load carried by the wheel. Eccentric movement of the external gear 38 is obtained without interference from the driving shaft 16 by reason of the eccentric opening in the gear through which the driving shaft extends.

In the illustrated embodiment of our invention, the external gear is provided with 38 teeth and the internal gear with 42 teeth. It will be understood, however, that our invention is not limited to this particular gear ratio but that other gear ratios may be employed as well.

By virtue of our invention positive driving control of the external gear and controlled relationship between the external and internal gears are established. The same means which imparts eccentric motion to the external gear serves also to prevent rotation of such gear. Smoother and noiseless operation together with a reduction in wearing friction are obtained. The employment of simpler parts has obviated precision shop operations and eliminated the need for expensive tools required to perform such operations. A reduction in the number of parts required has been achieved resulting in a lighter, more compact and economical hoist than has heretofore been known. Moreover, these salutary results have been accomplished while attaining a substantial increase of efficiency of approximately seven percent.

It will be apparent that numerous changes and modifications in the details of the invention will be clear to those skilled in the art. It is intended, therefore, that all such modifications and changes be comprehended within this invention which is to be limited only by the scope of the claims appended hereto.

We claim:

1. In a hoist, a housing member, a driving shaft journalled in said housing member, driven shafts journalled in said housing member and having eccentric portions, gears mounted upon said driving and driven shafts for rotation therewith, said gears on said driven shafts meshing with said gear on said driving shaft, an external gear mounted on said eccentric portions and having an opening of greater diameter than said driving shaft through which said driving shaft extends, an internal gear mounted in said housing member and meshing with said external gear, and a load wheel mounted upon and rotatable with said internal gear.

2. In a hoist, a housing member, a driving shaft journalled in said housing member, driven shafts journalled in said housing member and having eccentric portions, gears mounted upon said driving and driven shafts for rotation therewith, said gears on said driven shafts meshing with said gear on said driving shaft, a gear mounted on said eccentric portions and having an opening of greater diameter than said driving shaft through which said driving shaft extends, and a gear mounted in said housing member and meshing with said gear mounted on said eccentric portions.

3. In a hoist, a housing member, a driving shaft journalled in said housing member, driven shafts journalled in said housing member and having eccentric portions, driving connections between said driving and driven shafts, an external gear mounted on said eccentric portions and having an opening of greater diameter than said driving shaft through which said driving shaft extends, and an internal gear mounted in said housing member and meshing with said external gear.

4. In a hoist, a housing member, a concentric driving shaft journalled in said housing member, driven shafts journalled in said housing member and having eccentric portions, driving connections between said driving and driven shafts, an external gear mounted on said eccentric portions and having an opening eccentric with and of larger diameter than said driving shaft through which said driving shaft extends, and an internal gear rotatably mounted in said housing member and meshing with said external gear.

5. In a hoist, a housing member, a concentric driving shaft journalled in said housing member, a pair of driven shafts journalled in said housing member on opposite sides of said driving shaft and having eccentric portions, driving connections between said driving and driven shafts, an external gear mounted on said eccentric portions and having an opening eccentric with and of larger diameter than said driving shaft through which said driving shaft extends, and an internal gear rotatably mounted in said housing member and meshing with said external gear.

CHARLES C. MARTIN.
DAVID A. ROUND.

REFERENCES CITED

The following references are of record in the file of this patent:

UNITED STATES PATENTS

| Number | Name | Date |
|---|---|---|
| 1,673,838 | Mackenzie | June 19, 1928 |

FOREIGN PATENTS

| Number | Country | Date |
|---|---|---|
| 477,792 | Great Britain | Jan. 6, 1935 |